(12) United States Patent
Lillington (10) Patent No.: US 9,461,510 B2
(45) Date of Patent: Oct. 4, 2016

(54) PERMANENT MAGNET ELECTRICAL MACHINE

(71) Applicant: RADIAL FLUX LABORATORIES PTY LTD, Peakhurst (AU)

(72) Inventor: Paul Evan Lillington, Lugarno (AU)

(73) Assignee: RADIAL FLUX LABORATORIES PTY LTD, Peakhurst (AU)

(*) Notice: Subject to any disclaimer, the term of this patent is extended or adjusted under 35 U.S.C. 154(b) by 200 days.

(21) Appl. No.: 14/347,233

(22) PCT Filed: Sep. 20, 2012

(86) PCT No.: PCT/AU2012/001131
§ 371 (c)(1),
(2) Date: Mar. 25, 2014

(87) PCT Pub. No.: WO2013/044293
PCT Pub. Date: Apr. 4, 2013

(65) Prior Publication Data
US 2014/0246938 A1    Sep. 4, 2014

(30) Foreign Application Priority Data

Sep. 26, 2011 (AU) .................... 2011903974
Jun. 26, 2012 (AU) .................... 2012902715

(51) Int. Cl.
*H02K 1/27* (2006.01)
*H02K 1/28* (2006.01)
(52) U.S. Cl.
CPC .............. *H02K 1/27* (2013.01); *H02K 1/2746* (2013.01); *H02K 1/28* (2013.01); *H02K 2213/12* (2013.01)
(58) Field of Classification Search
CPC .................................................. H02K 1/2766
See application file for complete search history.

(56) References Cited

U.S. PATENT DOCUMENTS 2,483,848 A   10/1949  Saretzky
3,210,584 A   10/1965  Jorgensen
(Continued)

FOREIGN PATENT DOCUMENTS

FR      2958466 A1   10/2011
GB    191015587 A    9/1910
(Continued)

OTHER PUBLICATIONS

Niazi, "Permanent Magnet Assisted Synchronous Reluctance Motor Design and Performance Improvement," Dissertation, Texas A&M University, Dec. 2005, 153 pages.

*Primary Examiner* — Naishadh Desai
(74) *Attorney, Agent, or Firm* — McDermott Will & Emery LLP (57) ABSTRACT

A 2-pole machine arrangement (10) has a stator (100) with windings (101) in conventional form, wound either in a single phase or three phase configuration. The rotor is formed of stacked laminations. The laminations include rotor pole pieces (107) located between the two magnetic poles. Each pole is formed by a pair of (embedded) permanent magnets (103), angularly spaced-apart by inter-magnet segments (106). The rotor pole pieces (107) include a series of evenly-spaced slots (109) and a central void (108). The slots (109) are of various lengths to direct the flux from the magnets (103) into the air gap (121) at a desired angle normal to the rotor surface. The slots 109 may be varied in width and angle to achieve the desired lowest waveform distortion under load and the highest air gap flux. The slots (109) also contribute to changing the saliency of the rotor.

16 Claims, 10 Drawing Sheets

(56) References Cited

U.S. PATENT DOCUMENTS

| | | | |
|---|---|---|---|
| 3,243,620 A | 3/1966 | Suhr | |
| 3,493,799 A | 2/1970 | Lacroux | |
| 3,597,646 A | 8/1971 | Lawrenson | |
| 3,652,885 A | 3/1972 | Honsinger | |
| 3,721,844 A | 3/1973 | Fong | |
| 4,074,160 A | 2/1978 | Broadway | |
| 4,568,846 A | 2/1986 | Kapadia | |
| 4,658,165 A | 4/1987 | Vanderschaeghe | |
| 4,703,243 A * | 10/1987 | Ettelman | H02P 8/22 310/156.35 |
| 5,296,773 A | 3/1994 | El-Antably et al. | |
| 5,452,590 A * | 9/1995 | Vigili | H02K 1/2773 310/156.57 |
| 5,559,386 A | 9/1996 | Gurrieri | |
| 5,818,140 A | 10/1998 | Vagati et al. | |
| 5,831,367 A | 11/1998 | Fei et al. | |
| 6,029,336 A | 2/2000 | Kliman et al. | |
| 6,066,904 A | 5/2000 | Fei et al. | |
| 7,282,829 B2 | 10/2007 | Jung et al. | |
| 7,521,832 B2 * | 4/2009 | Tajima | H02K 1/2766 310/156.48 |
| 7,923,881 B2 * | 4/2011 | Ionel | H02K 21/46 310/156.53 |
| 8,508,094 B2 | 8/2013 | Matt et al. | |
| 2003/0094875 A1 | 5/2003 | Sakuma et al. | |
| 2004/0041486 A1 * | 3/2004 | Gary | H02K 1/276 310/156.57 |
| 2004/0135454 A1 * | 7/2004 | Takahashi | H02K 1/278 310/156.45 |
| 2007/0046266 A1 | 3/2007 | Ganev et al. | |
| 2009/0134849 A1 | 5/2009 | Gottfried | |
| 2011/0121668 A1 | 5/2011 | Condamin et al. | |

FOREIGN PATENT DOCUMENTS

| | | |
|---|---|---|
| JP | 60-026444 A | 2/1985 |
| JP | 06-245419 A | 9/1994 |
| JP | 08-242567 A | 9/1996 |
| JP | 2011-524735 A | 9/2011 |
| JP | 2011-217602 A | 10/2011 |
| WO | WO-2008/105049 A1 | 9/2008 |
| WO | WO-2009/153511 A2 | 12/2009 |

* cited by examiner

Fig 10

PERMANENT MAGNET ELECTRICAL MACHINE

TECHNICAL FIELD

This invention relates generally to a permanent magnet (PM) electrical machine operating either as a synchronous generator or a synchronous motor. More particularly, the invention relates to the control of harmonic components in the output/stator voltage and current waveforms under load.

BACKGROUND

PM synchronous machines are robust, reliable and efficient, and have a relatively high energy density. They have many attractive properties compared with wound-field synchronous machines with brushed or brushless exciters. The need to save energy and increase the efficiency of motors and generators means PM synchronous machines are becoming a popular candidate because of their no-loss rotors. In some cases an energy saving of up to 20% can be achieved by using PM rotors in place of wound rotors.

Despite these advantages, some current designs of PM synchronous machines have shortcomings. They use relatively high volumes of magnetic material that increases their cost. When operated as synchronous generators they have poor voltage regulation and can suffer from distorted voltage and current waveforms under load. When operated as synchronous motors they are difficult to start without some form of sensor feedback. Also, their (stator) back emf waveforms under load are distorted, reducing their efficiency and requiring more complex control electronics.

These problems are greater with low pole number (e.g., 2- and 4-pole) machines, where serious waveform distortion under load commonly occurs. The distortion arises due to the so-called flux drag effect that causes the magnetic flux in the rotor to skew away from the radial axis of the magnets due to the load current in the windings. 2- and 4-pole PM generators also use more magnet material for the same power output than do higher pole number generators. Accordingly, PM synchronous generators have not found widespread use in small-scale power applications, such as single-phase and, three-phase 3000 rpm (2-pole) or 1500 rpm (4-pole) petrol and diesel driven generators in the 5 to 20 kW range.

The only practical current 2- and 4-pole designs are surface-mount magnet types. However, these also have distorted output voltage/back emf and current waveforms under load, and can suffer from demagnetization of the magnet edges under high loads. Surface-mounted magnet segments for 2-pole and 4-pole rotors have a large arc segment, meaning there is a large amount of waste material in their manufacture, increasing the monetary cost of the magnets. Current designs of surface-mount PM AC generators exhibit a large voltage drop under load. As there is no simple method of voltage regulation at constant speed for these machines, generator applications requiring good voltage regulation, cannot use PM synchronous types.

There are, however, PM synchronous generators which have acceptable waveform and voltage regulation. These have one-piece PM rotors. The main problem with these designs is that they use up to six times or more magnet material than the equivalent surface-mount designs, even in the lower powers, and cannot be made in a 4-pole configuration. Rather, such machines are only practical in 2-pole designs up to 3 kW power rating. Above this level the magnet cost and volume increases to the square of the rotor diameter, making them no longer cost-effective.

These problems mean that current designs of PM generators and motors are suitable only for low-grade, low power applications where voltage regulation (i.e., generators) or back emf (i.e., motors), and harmonic distortion are unimportant.

A need exists to overcome or at least ameliorate one or more of these disadvantages.

SUMMARY OF INVENTION

In one broad form, there is provided an electrical synchronous machine comprising a wound stator and a rotor. The rotor includes at least two magnetic poles with each pole being formed of a pair of angularly spaced-apart permanent magnets, a rotor pole piece located between each said pole, a triangularly shaped void located in the rotor pole piece, and a plurality of slots located in the rotor pole piece.

Other aspects are disclosed.

DETAILED DESCRIPTION

In what follows, reference to "an electrical machine" (or simply "a machine") is to be understood as applying equally to a machine configured and/or operated as a generator or motor, unless specifically indicated as being otherwise.

Figure 1:
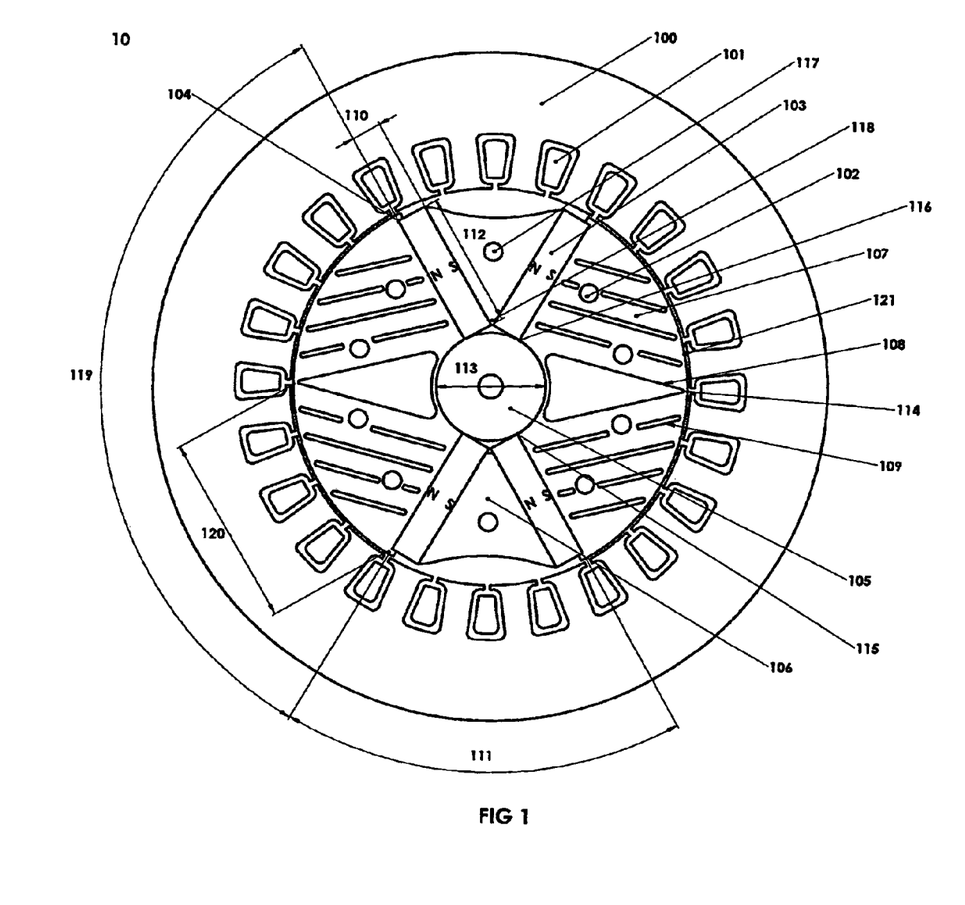
FIG. 1 shows a sectional view of a two-pole machine.

FIG. 1 shows, in cross-section, a 2-pole machine arrangement 10 embodying the invention. The stator 100 has windings 101 in conventional form, wound either in a single phase or three phase configuration. The rotor is formed of stacked laminations. The number of such laminations determines the power output of the machine. The laminations are clamped together by rods (not shown in FIG. 1) passing through the spaced holes 102 and 117, and secured at either end-most lamination, typically using end plates (not shown). A typical rotor diameter for a 5 to 20 kW machine is in the range 100 mm to 130 mm. The laminations include rotor pole pieces 107 located between the two magnetic poles. Each pole is formed by a pair of (embedded) permanent magnets 103, angularly spaced-apart by inter-magnet segments 106. The magnets 103 and rotor pole pieces 107 are mounted from a central shaft 105. The shaft typically is formed of non-magnetic material.

The rotor pole pieces 107 include a series of evenly-spaced slots 109 and a central void 108. The void ideally would extend from a point 114 near the air gap 121 to the inner points 115 and 116 at the foot of the respective magnet, however this would compromise the structural integrity of the rotor, in which case the void 108 leaves a margin of rotor material as shown. The slots 109 are of various lengths to direct the flux from the magnets 103 into the air gap 121 at a desired angle normal to the rotor surface. The slots 109 may be varied in width and angle by modelling or experimental trial to achieve the desired lowest waveform distortion under load and the highest air gap flux. The slots 109 also contribute to changing the saliency of the rotor, as will be described below. The voids 108 and slots 109 would normally be occupied by free space, but could equally be filled with a non-magnetic material, such as aluminium.

Figure 2A:
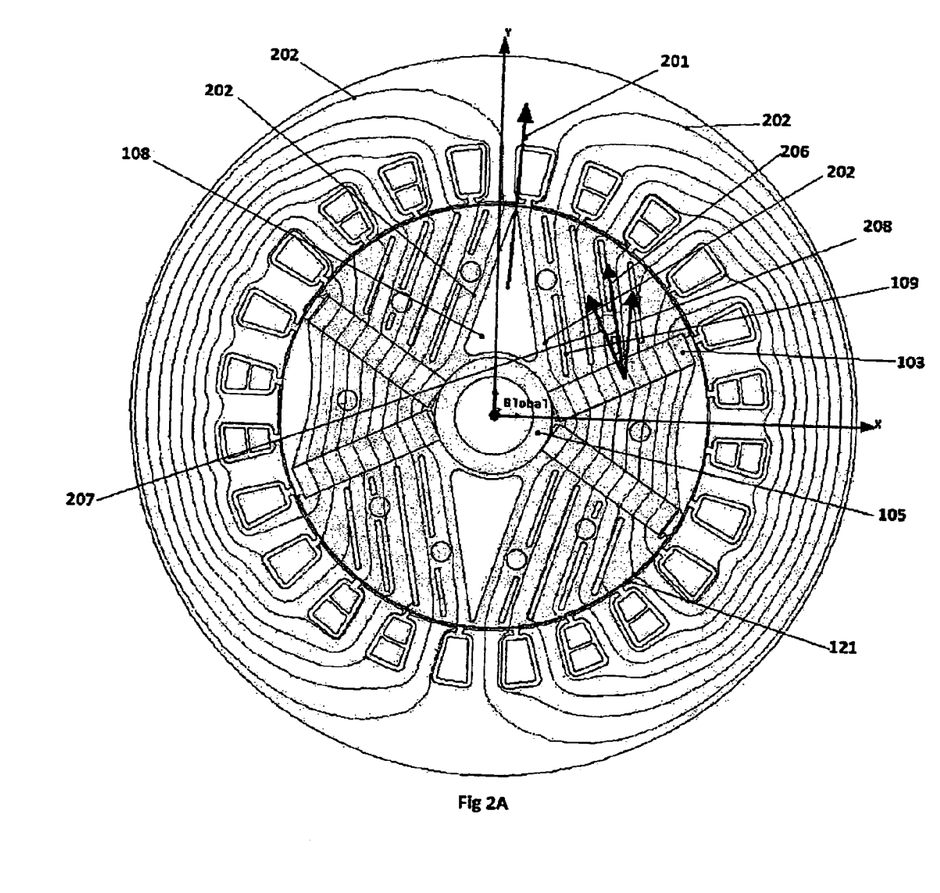
FIG. 2A shows the flux lines for no load for the machine of FIG. 1.

Saliency is the ratio of the direct axis inductance (Xd) divided by the quadrature axis inductance (Xq). The Xd axis lies in the direction 201 shown in FIG. 2A, and Xq axis is at 90 degrees thereto. The magnetic flux lines 202 also are shown. The slots 109 are positioned in a direction 206 which bisects the angle between the Xd axis 208 (repositioned for graphical representation) and the magnetic polar (N-S) axis 207. Such slot orientation represents the best engineering compromise between the Xd axis and the magnets' orientation, and results in the optimum flux flow with least obstruction for the configuration in FIG. 1 under both load and no load conditions.

The length 112 and width 110 of the magnets 102 is determined by having them touch at an inner point 118 and extend to, an outer point 104. The length 112 for an ideal 2-pole rotor should half the pole arc length, which is the radius of the rotor, but if this were the case the magnets' width 110 would be zero and there would be no room for a shaft 105. It has found that a ratio of 0.7 to the pole arc length 120 gives maximum air gap flux while allowing an adequate shaft diameter 113. The outer point 104 is constrained by the need to keep the magnets held in place against the centrifugal force that arises when the machine is at full speed, but should ideally extend to the full diameter of the rotor. The overhang at 104 on the rotor pole pieces 107 could also be removed and the magnets held in place via other methods such as gluing or bonding. The arc segment 111 for a 2-pole rotor preferably is 60 degrees, or one half of the arc length 119, representing an arc ratio (for a 2-pole machine) of ⅓. This split-magnet arrangement results in a significant saving in cost by reducing the volume of magnetic material needed by about 50%.

Figure 2B:
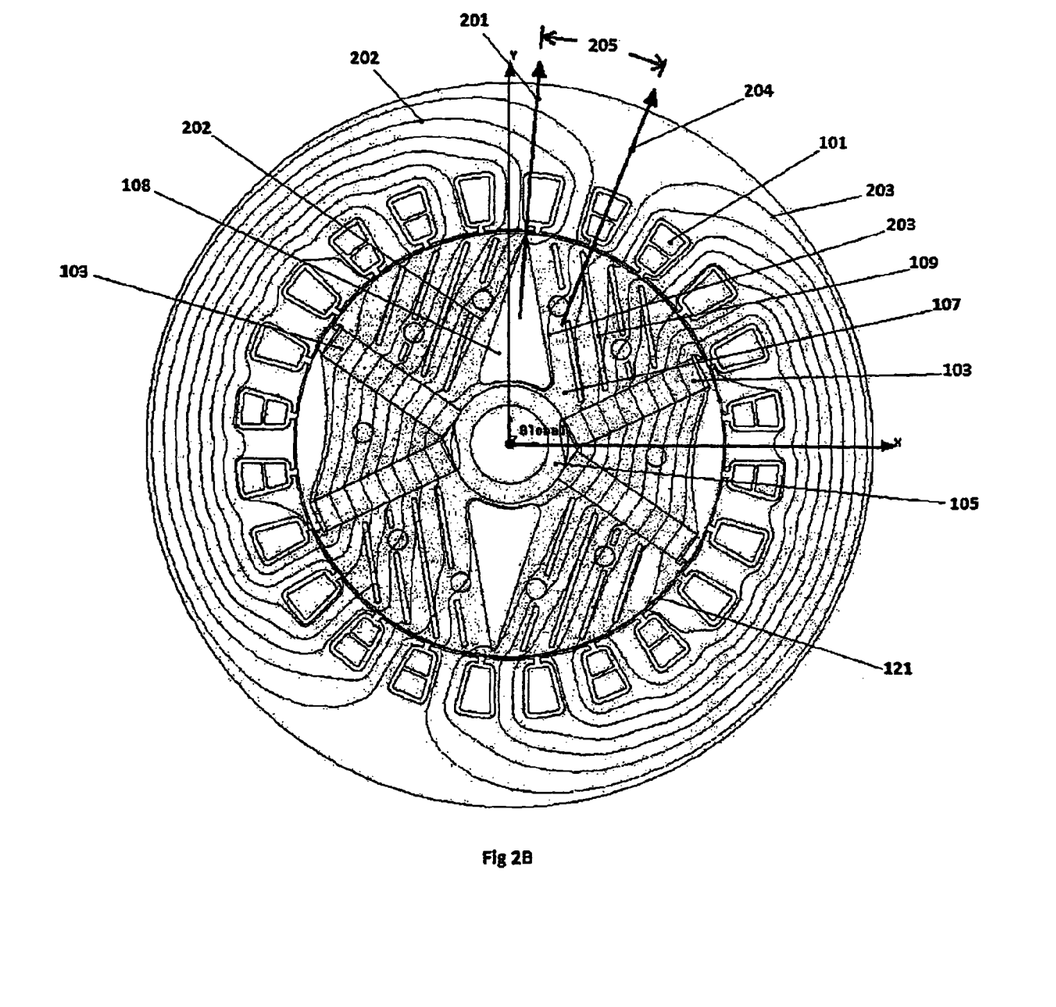
FIG. 2B shows the flux lines for full load for the machine of FIG. 1.

FIG. 2B shows the flux lines for the 2 pole machine 10 of FIG. 1 at full electrical or mechanical load. While the Xd axis 201 lies at the centre of the flux lines at no load, the Xd axis under load 204 moves through an arc 205, resulting in flux drag caused by the torsional load on the shaft 105 and the current in the windings 101. The central voids 108 and the slots 109 ameliorate the flux drag effect. It can also be seen that the flux lines 203 from the magnet 103 have been dragged to the right. It can further be seen that the current flowing in the windings 101 is trying to drag flux from the magnet 103 to the right-hand side of the magnet. If this is allowed to happen then there will be uneven flux in the air gap 120. The number of slots included represents a compromise between increasing saliency and avoiding insufficient material forming the pole pieces that would result in saturation, leading to poor voltage regulation.

Figure 3:
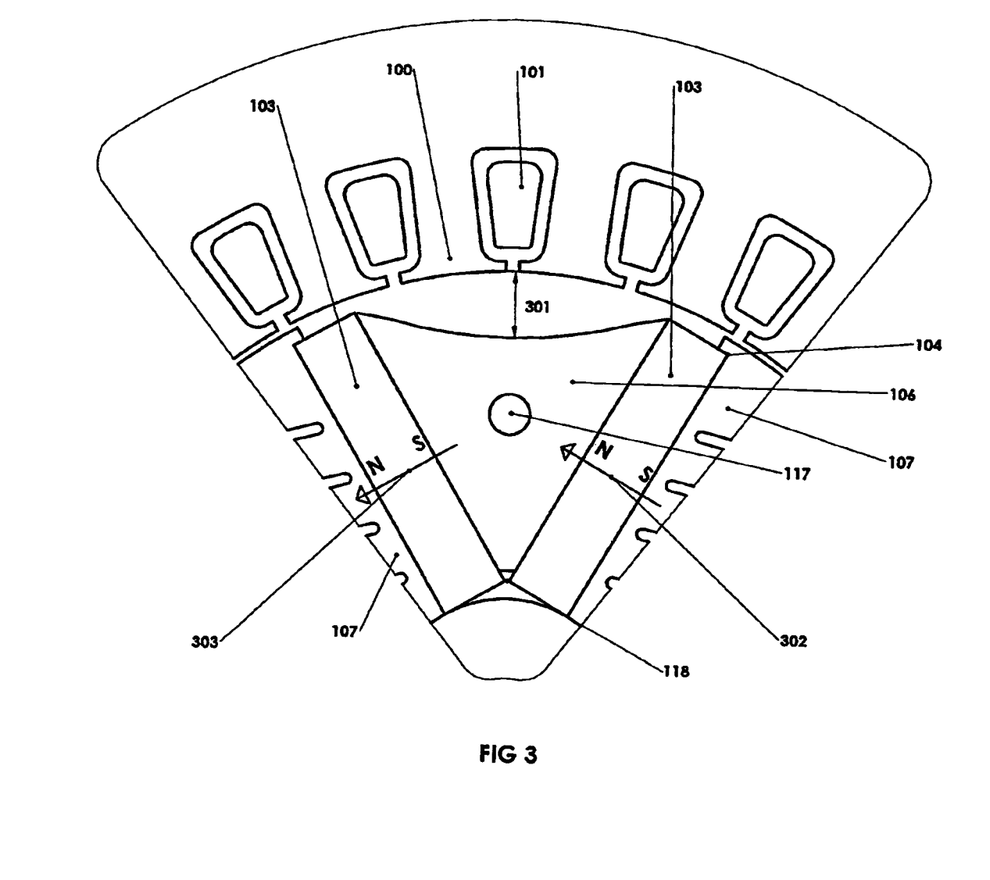
FIG. 3 is a partial sectional view of the machine of FIG. 1.

Referring now to FIG. 3, it can be seen that the inter-magnet segment 106 is curved, giving a large air gap clearance 301. This is done so that the flux linkage to the stator 100 is kept to a minimum. The clearance 301 is restricted by the need to provide sufficient magnetic material to prevent the inter-magnet pole pieces 106 from becoming saturated. The inter-magnet segment 106 also locks the magnets 103 securely in place, and also keeps the magnets in close contact to the rotor pole pieces 107.

Figure 4:
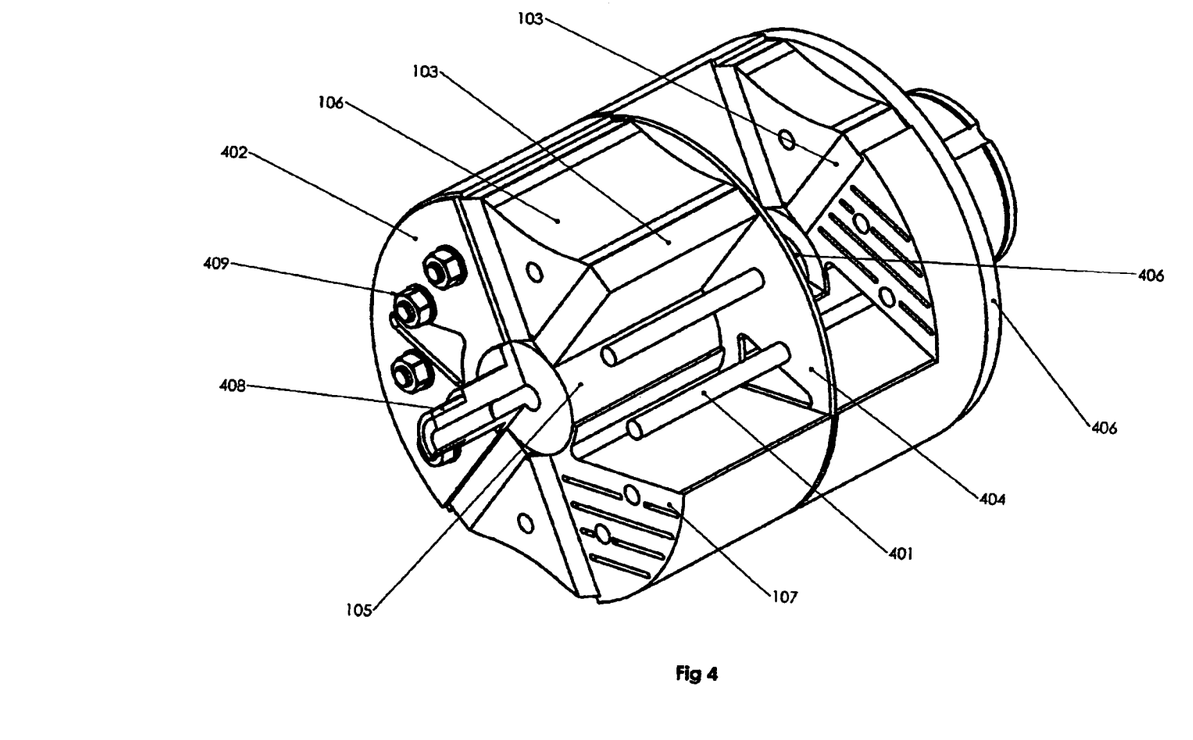
FIG. 4 shows a cut-away view of an assembled two-pole machine.

FIG. 4 shows a cut-away view of the rotor in FIG. 1 where stacked laminations of rotor pole pieces 107 are held in place by bolts 401. The magnets 103 and segments 106 are fitted between the stacked rotor pole pieces 107, and retained by respective bolts. An intermediate plate 404 is provided to mechanically support the pole pieces 107. The bolts 401 are made from mild or high tensile steel, and are magnetic so as to allow flux to pass through them. The bolts 401 are anchored to a flange 406, and at the other end, a plate 402 and nuts 409 serve to both clamp the rotor pole pieces 107 together, and hold the magnets 103 and inter-magnet segments 106 to the shaft 105. For ease of assembly, the magnets of a longer rotor are also split into segments 103' lengthwise. The shaft 105 has a female taper for driving the machine when operated as a generator by an engine. This taper drive could be replaced with any suitable drive. On the back end of the shaft 105 is a stub shaft 408 to take a bearing for end support.

Figure 5:
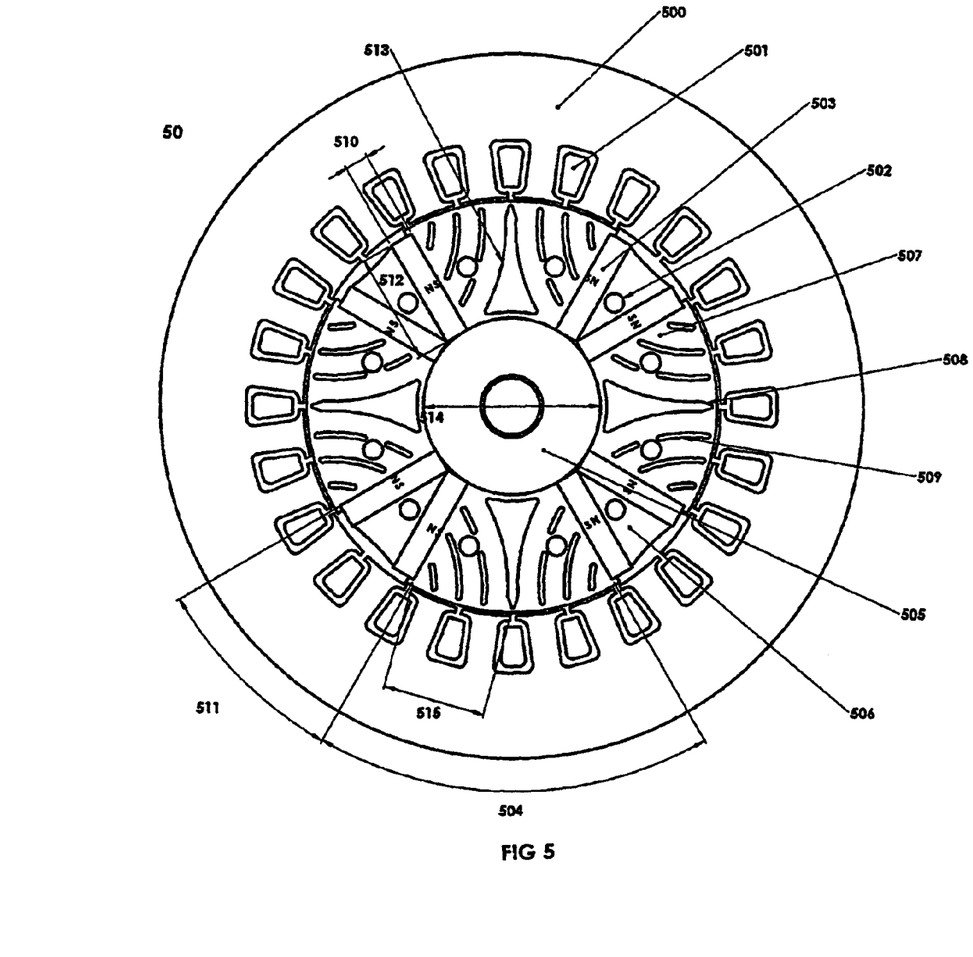
FIG. 5 shows a sectional view of a four-pole machine.

FIG. 5 shows a 4-pole PM AC machine 50 embodying the invention. The machine 50 has a stator 500, windings 501, embedded permanent magnets 503 (i.e., a pair per pole), inter-magnet segments 506 and central shaft 505, as is the case with the generator shown in FIG. 1. In the same way, fixing holes 502 are provided, as are rotor pole pieces 507. In this 4-pole rotor arrangement, the correct ratio of magnet length 512 is the dimension 515, which is V2 pole segment 504. This dimensioning achieves maximum flux concentration for the minimum magnet volume. The reduction in magnet volume achieved by segmenting the magnet into two pieces is less than in a 2-pole rotor, at around 38%. However, the output power per volume of magnet is higher due to the higher air gap flux. This is because the ideal magnet-to-pole arc ratio can be achieved in 4-pole designs. The central void 508 has the same dimensional constraints as in FIG. 1, but has curved sides 513 to follow the required 4-pole flux lines. There are three flux control slots 509 having a curved profile, to also follow the required flux lines. A larger shaft dimension 514 than is the case for the embodiment of FIG. 1 can be accommodated.

Figure 6A:
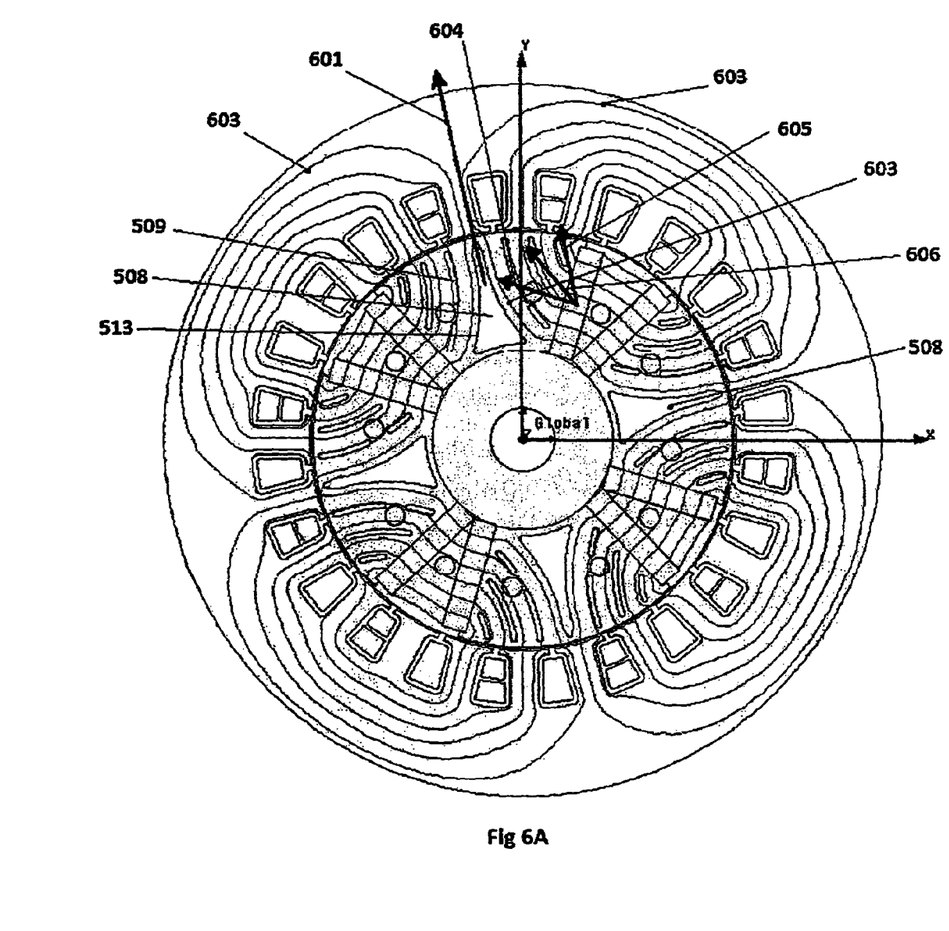
FIG. 6A shows the flux lines for no load for the machine of FIG. 5.

FIG. 6A shows the no-load flux lines 603 for a 4-pole embodiment of FIG. 5, where the Xd axis 601 lies in the centre of the flux lines 603. Similarly to the 2-pole configuration, the curved slots 509 are orientated in the direction 606 that bisects the Xd axis 601 and the magnet polar axis 605. It can be seen that the curved sides 513 of the central void 508 and the curved slots 509 follow the flux lines 603.

Figure 6B:
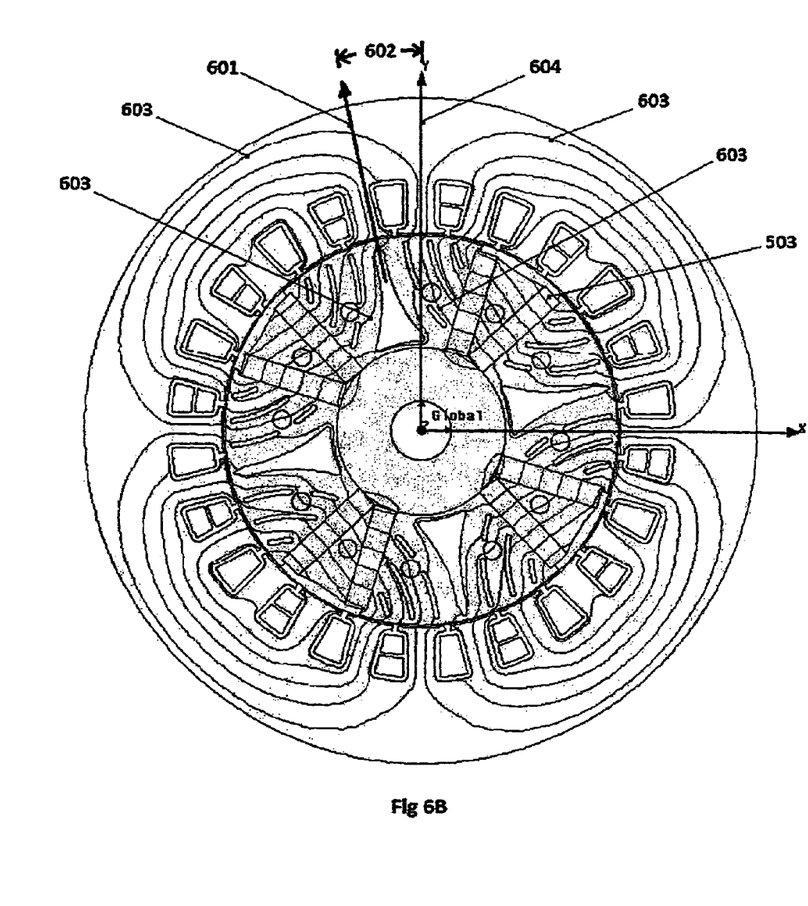
FIG. 6B shows the flux lines for full load for the machine of FIG. 5.

FIG. 6B shows the flux lines 603 in the 4-pole rotor under full load, from which it can be seen that the effective centre of flux has moved from axis 601 to 604 by an arcuate distance 602. This exemplifies the flux drag effect for the 4-pole embodiment of FIG. 5. It can also been seen, as in FIG. 6A, that current in the winding is trying to drag the flux lines 603 to the right.

Figure 7:
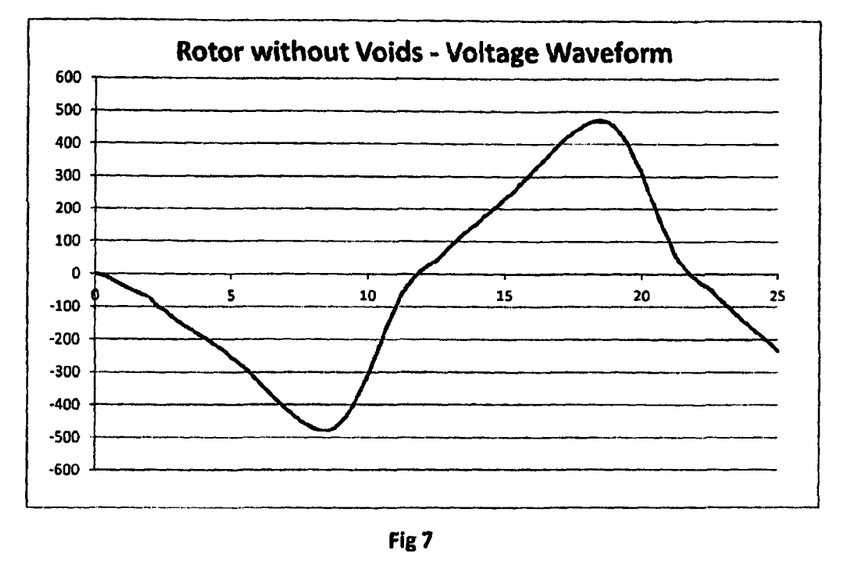
FIG. 7 shows an output voltage waveform under load for a known 2-pole machine (i.e., with no flux voids)
Figure 8:
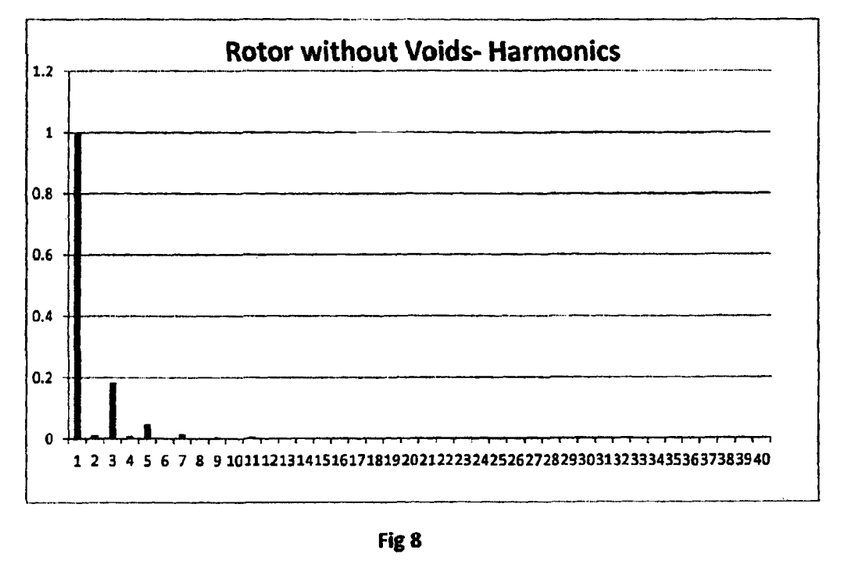
FIG. 8 shows a plot of the fundamental and harmonic frequency components of the output waveform of FIG. 7.

FIG. 7 shows the output voltage waveform/back emf under load for a known 2-pole embedded magnet machine without flux voids or flux control slots. FIG. 8 is a plot of the harmonics in the waveform of FIG. 7, showing a third harmonic component of about 19.0%, and fifth harmonic of about 7.0%, with total harmonic distortion (THD) of over 20%.

Figure 9:
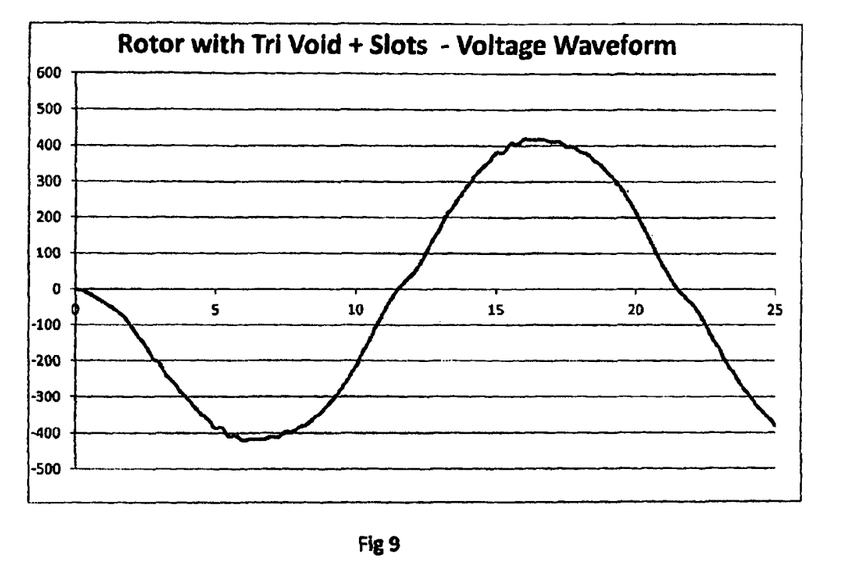
FIG. 9 shows an output voltage waveform under load for the two-pole machine of FIG. 1.
Figure 10:
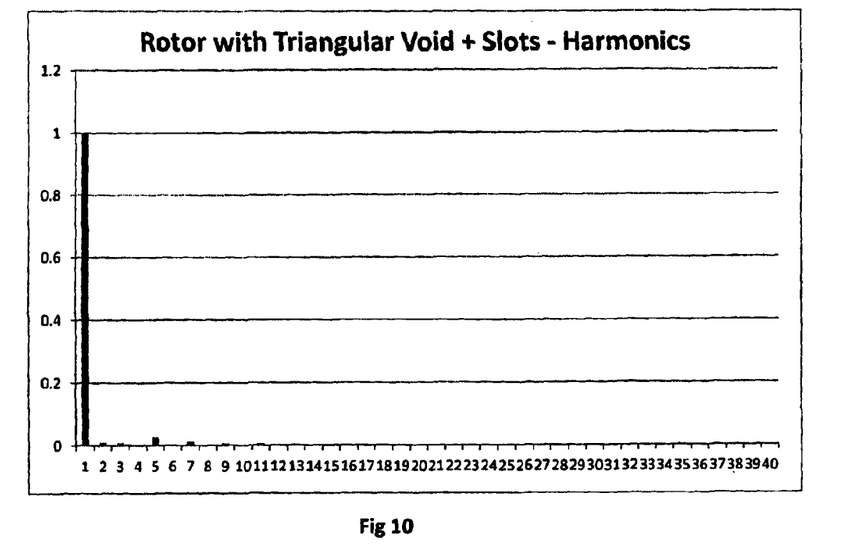
FIG. 10 shows a plot of the fundamental and harmonic frequency components of the output waveform of FIG. 9.

FIG. 9 shows the output voltage waveform/back emf under load for the machine shown in FIG. 1, demonstrating a near-sinusoidal shape. FIG. 10 is a plot of the harmonics in the waveform/back emf shown in FIG. 9, indicating a third harmonic component of about 1.0%, and fifth harmonic of about 1.5%, with THD of less than 4%. Additionally, skewing the stator also reduces the THD further by 50-60% overall.

In other embodiments, the slots in the stator 100 containing the windings 101 can be skewed by 1 or more slots over the length of the stator to further reduce the THD. This reduces the harmonic produced by the magnets passing over the slot openings. The rotor can be diecast in one piece, using the diecast aluminium in the slots and void to effectively clamp the rotor segment 116 together, thus eliminating the need for the clamping bolts 401 and nuts 409. A secondary effect of the voids and slots in the rotor segments 107 is to improve the voltage regulation under load when operated as a generator. When operated as a motor, the voids and slots improve the torque efficiency (Nm/A) as mechanical load is increased.

In the embodiments shown, the measured voltage regulation, when operated as a generator, from no load to full load was only ±3%. Also, the effect of improved THD and voltage regulation improves the efficiency of the generator.

When operated as a motor, a 20% improvement in torque delivered for the same current at full load was observed compared with the known 2-pole machine. Additionally, since the back emf exhibits a good sine wave, high efficiency is achieved over the full load range. Furthermore, the back emf changes as the load torque forces the flux from the centre point, and this drop in back emf results in an increased current, meaning no feedback is required to a variable frequency supply with changing loads (i.e., providing full sensor-less control). Since the machine design exhibits a non-linear torque/back emf relationship, a resultant large angle exists over which the rotor can produce effective torque, making low pole number motors easier to start.

The foregoing describes only some embodiments of the present invention, and modifications and/or changes can be made thereto without departing from the scope and spirit of the invention, the embodiments being illustrative and not restrictive.

The invention claimed is:

1. A permanent magnet rotating electrical machine comprising:
    a wound stator; and
    a round rotor including:
        at least two magnetic poles with each pole being formed of a pair of angularly spaced-apart permanent magnets, the pair of angularly spaced-apart permanent magnets being arranged such that unlike magnetic poles of the pair of angularly spaced-apart permanent magnets face each other;
        a rotor pole piece located between respective pairs of poles;
        a triangularly shaped void located in the middle of each rotor pole piece; and
        a plurality of elongate slots located in each rotor pole piece, between the triangularly shaped void and an adjacent magnet,
    wherein the slots are oriented in the rotor pole piece to bisect the direct axis inductance under no-load conditions and the magnetic polar axis.

2. The machine of claim 1, wherein the voids and slots are dimensioned and located such that the relative total harmonic distortion of the output voltage waveform under load is less than 5%.

3. The machine of claim 1, wherein there are two poles and four slots between a void and an adjacent magnet.

4. The machine of claim 1, wherein there are four poles and three slots between a void and an adjacent magnet.

5. The machine of claim 1, further including a triangularly shaped inter-magnet segment located between the magnets of each pole.

6. The machine of claim 1 configured as a generator.

7. The machine of claim 1 configured as a motor.

8. The machine of claim 2, further including a triangularly shaped inter-magnet segment located between the magnets of each pole.

9. The machine of claim 2 configured as a generator.

10. The machine of claim 2 configured as a motor.

11. The machine of claim 3, further including a triangularly shaped inter-magnet segment located between the magnets of each pole.

12. The machine of claim 3 configured as a generator.

13. The machine of claim 3 configured as a motor.

14. The machine of claim 4, further including a triangularly shaped inter-magnet segment located between the magnets of each pole.

15. The machine of claim 4 configured as a generator.

16. The machine of claim 4 configured as a motor.

* * * * *